Dec. 29, 1925.
C. E. SHEARER
1,568,002
SHOCK ABSORBER FOR MOTOR VEHICLES
Filed Nov. 7, 1923　　2 Sheets-Sheet 1
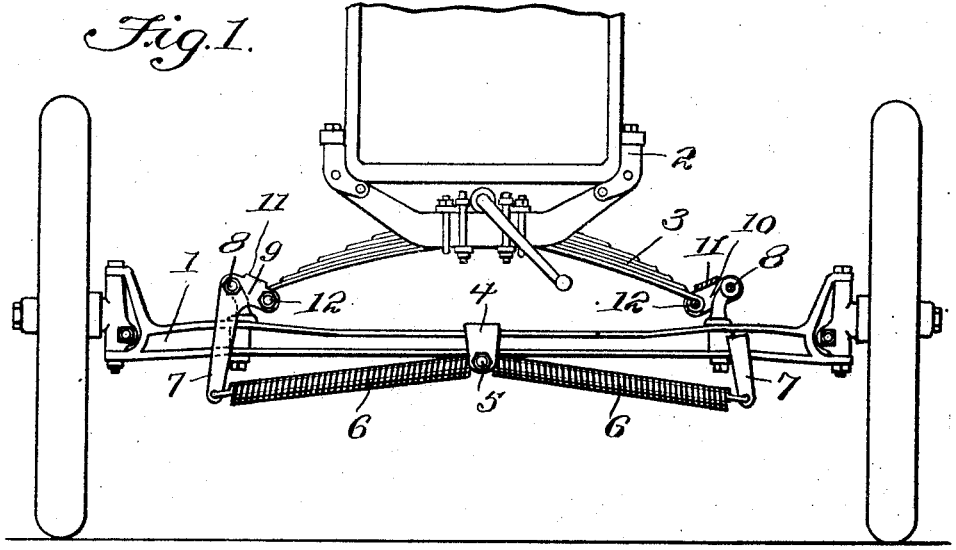
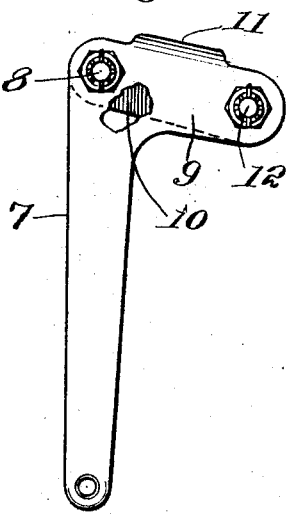
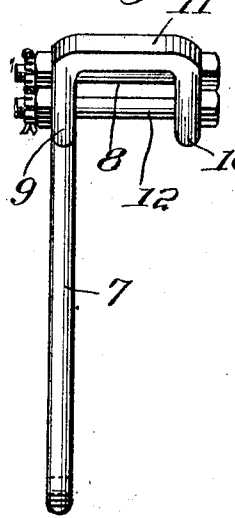
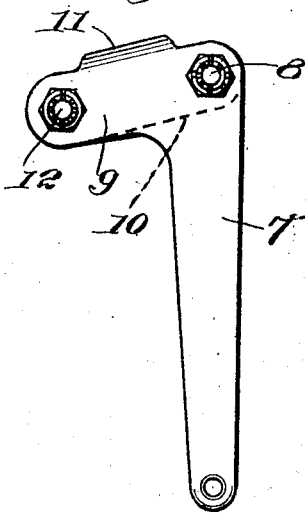
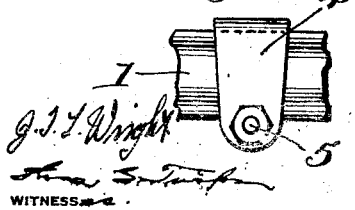
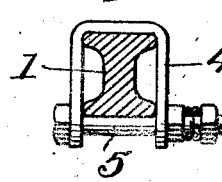
Charles E. Shearer,
INVENTOR
BY Victor J. Evans
ATTORNEY Dec. 29, 1925.   1,568,002
C. E. SHEARER
SHOCK ABSORBER FOR MOTOR VEHICLES
Filed Nov. 7, 1923   2 Sheets-Sheet 2
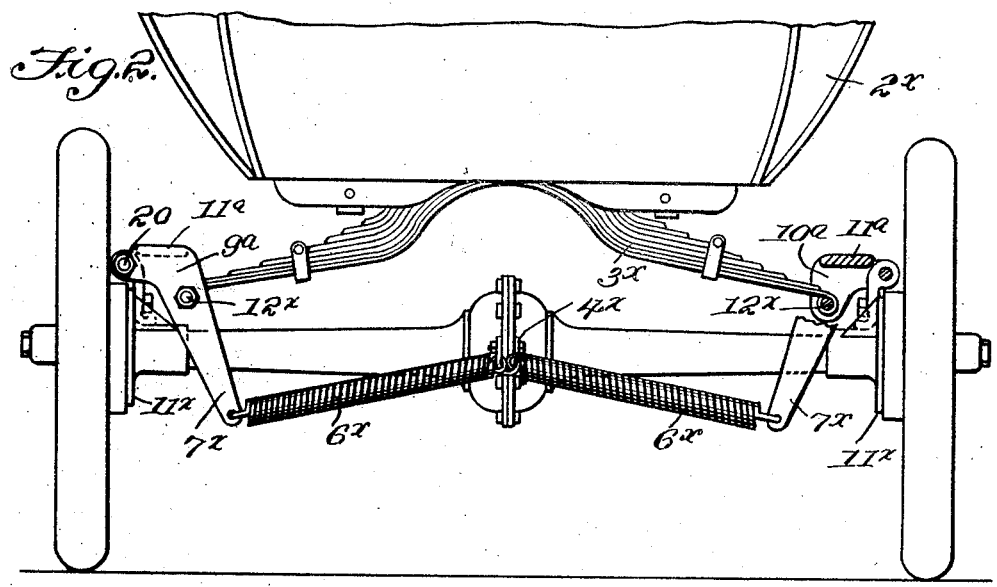
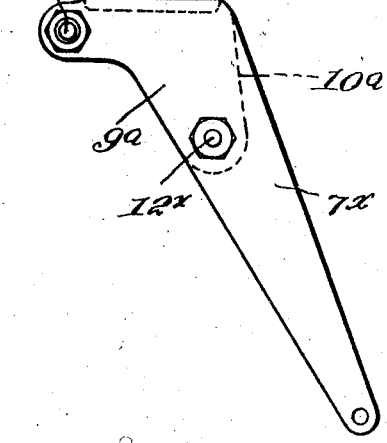
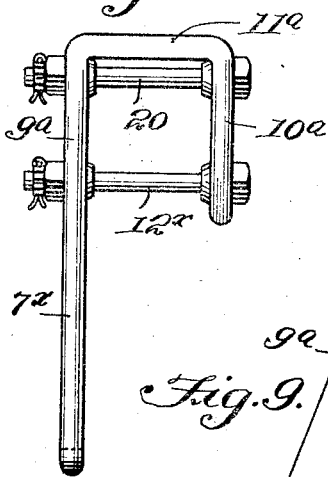
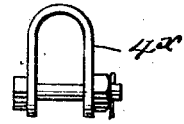
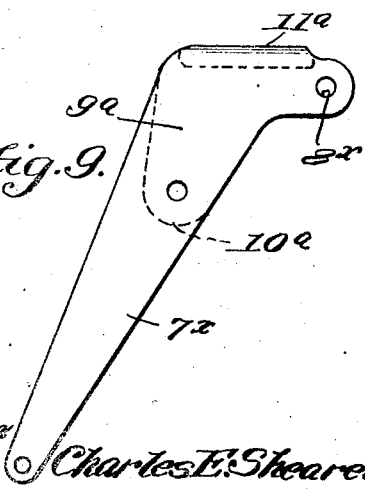
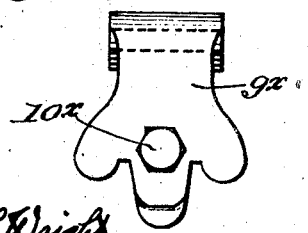
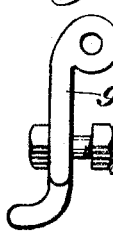

Patented Dec. 29, 1925.

1,568,002

UNITED STATES PATENT OFFICE.

CHARLES E. SHEARER, OF AMARILLO, TEXAS.

SHOCK ABSORBER FOR MOTOR VEHICLES.

Application filed November 7, 1923. Serial No. 673,376.

*To all whom it may concern:*

Be it known that I, CHARLES E. SHEARER, a citizen of the United States, residing at Amarillo, in the county of Potter and State of Texas, have invented new and useful Improvements in Shock Absorbers for Motor Vehicles, of which the following is a specification.

My present invention has to do with the kind of shock absorbers that are associated with the rear and front transverse springs of motor vehicles, and it contemplates the provision of a shock absorber of the kind indicated, characterized by simplicity and strength in construction and efficiency in operation, and also characterized by the facility with which it may be installed on vehicles at present in use.

To the attainment of the foregoing, the invention consists in the improvement as hereinafter described and definitely claimed.

In the accompanying drawings, forming part of this specification:—

Figure 1 is a front elevation of a portion of a motor vehicle showing the embodiment of my invention that is applied to the front transverse spring of the vehicle.

Figure 2 is a rear elevation of a portion of a motor vehicle showing the application of one embodiment of my invention to the rear transverse spring, said view being partly in vertical cross-section.

Figures 3, 4, 5, 6 and 7 are detail views showing parts comprised in the embodiment illustrated in Figure 1.

Figures 8 to 13 are views showing parts comprised in the embodiment illustrated in Figure 2.

Similar numerals of reference designate corresponding parts in all of the views of the drawings.

In Figure 1 the numeral 1 designates the front axle of a motor vehicle, and 2 indicates the body frame while 3 indicates the front transverse spring, connected to the body 2 and arranged adjacent to the axle 1.

In accordance with the first mentioned embodiment of my invention, a shackle 4 is secured by a bolt 5 in straddling relation on the central portion of the axle 1, and a portion of the bolt 5 is utilized for the connection of the inner ends of two retractile springs 6. The outer ends of the said retractile springs 6 are connected to the pendent arms of reversely arranged angular levers 7, Figures 1, 3, 4 and 5, the said levers 7 being connected in fulcrumed manner at 8 to perches 9 fastened on the front axle 1. The upper arm of each angular lever 7 is directed inwardly and normally downward from the center of movement of the lever, Figure 1 and is provided with the spaced portions 9 and 10 in parallelism, the said portion 9 being in the same plane as the major portion of the lever, and the portion 10 being strongly connected to the portion 9 by a bar 11, as best shown in Figure 5. Carried by the portions 9 and 10 of each lever 7 is a bolt 12 which serves for the pivotal connection of one end of the spring 3.

By virtue of the construction described it will be manifest that the front portion of the body of the motor vehicle will be cushioned in a highly efficient manner by the retractile springs 6 in combination with the transverse spring 3, and the levers 7 interposed between the outer ends of the springs 6 and the ends of the spring 3 which latter is of the ordinary leaf type. It will also be appreciated that the transmission of shocks and jars to the body 2 will be reduced to a minimum, with the result that my improvement applied as stated will contribute materially to the easy riding quality of the motor vehicle.

In Figure 2 the vehicle body is designated by $2^x$ and the rear transverse spring is designated by $3^x$. In this embodiment a loop $4^x$ is connected to the equalizing gear housing of the motor vehicle, and retractile springs $6^x$ are connected at their inner ends to the said loop. At their outer ends the said springs $6^x$ are connected to the pendent portions of angular levers $7^x$, reversely arranged as illustrated in Figure 2. Each of the said levers $7^x$ is provided with an upper outwardly extending portion, and the said upper outwardly extending portion is pivotally connected at $8^x$ to a bracket $9^x$, connected by a bolt $10^x$ to the adjacent portion $11^x$ of the before mentioned housing. The pivot or fulcrum point $8^x$ is located above the housing portion $11^x$, and it will also be noted that the upper part of the lever includes spaced portions $9^a$ and $10^a$ in parallelism, connected by an integral portion $11^a$. The said portions $9^a$ and $10^a$ receive the bolt 20 by which the lever is pivotally connected to the adjacent bracket $9^x$ and they also receive a bolt $12^x$ by which the lever is pivotally connected to the adjacent end of the spring $3^x$. Manifestly this construction is extremely strong and durable and is therefore well adapted to withstand the rough treatment to which the rear portion of an automobile is ordinarily subjected.

The operation of the embodiment shown in Figure 2 is such that the rear portion of the body $2^x$ will be adequately cushioned, and at the same time the transmission of shocks and jars to the body $2^x$ will be practically eliminated, the cushion and shock absorbing capacity of the embodiment being due to the combination and relative arrangement as described of the spring $3^x$, the lever $7^x$ and the retractile springs $6^x$ being stretched on downward movement of the body $2^x$ and spring $3^x$, and thereby acting to cushion the body. It will also be noted that when the body $2^x$ tends to jump upwardly the springs $6^x$ will serve in a degree as snubbers.

I have entered into a detailed description of the construction and relative arrangement of parts embraced in the present and preferred embodiments of my invention in order to impart a full, clear and exact understanding of the said embodiments. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

In a shock absorber, the combination of a vehicle body, an axle, reversely arranged angular levers having normally inclined pendent portions and also having upper normally inclined portions spaced apart in parallelism, and angularly disposed portions fixedly connecting said vertical portions together, bolts extending through said parallel portions adjacent the juncture thereof with the pendent portions and effecting pivotal connection of the levers to the axle, a transverse spring connected to and carried by the body of the vehicle and having its end portion disposed between said normally inclined portions of the lever, bolts extending between said parallel portions adjacent their free ends and pivotally connecting the ends of said spring thereto, a connector secured midway between the ends of the axle and retractile springs connected at their inner ends to said connector and at their outer ends to the pendent portion of said levers.

In testimony whereof I affix my signature.

CHARLES E. SHEARER.